US010035289B2

(12) United States Patent
Tokita

(10) Patent No.: US 10,035,289 B2
(45) Date of Patent: Jul. 31, 2018

(54) MANUFACTURING APPARATUS FOR FILM OF NON-UNIFORM THICKNESS AND MANUFACTURING METHOD FOR FILM OF NON-UNIFORM THICKNESS

(71) Applicants: MITSUBISHI GAS CHEMICAL COMPANY, INC., Tokyo (JP); MGC FILSHEET CO., LTD., Saitama (JP)

(72) Inventor: Atsuhiro Tokita, Tokyo (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 0 days.

(21) Appl. No.: 15/310,955

(22) PCT Filed: Mar. 19, 2015

(86) PCT No.: PCT/JP2015/058277
§ 371 (c)(1),
(2) Date: Nov. 14, 2016

(87) PCT Pub. No.: WO2015/186408
PCT Pub. Date: Dec. 10, 2015

(65) Prior Publication Data
US 2017/0087757 A1    Mar. 30, 2017

(30) Foreign Application Priority Data

Jun. 4, 2014   (JP) ................... 2014-115761

(51) Int. Cl.
*B29C 43/46* (2006.01)
*B29C 47/00* (2006.01)
(Continued)

(52) U.S. Cl.
CPC ............ *B29C 47/004* (2013.01); *B29C 43/46* (2013.01); *B29C 47/0021* (2013.01);
(Continued)

(58) Field of Classification Search
CPC .............. B29C 43/46; B29C 2043/466; B29C 47/0021; B29C 47/004; B29C 47/14; B29C 47/16
See application file for complete search history.

(56) References Cited

U.S. PATENT DOCUMENTS 2,382,177 A * 8/1945 Schanz .................. B29C 47/32
264/173.17
3,738,790 A * 6/1973 Violette .................. B29C 47/00
425/380
(Continued)

FOREIGN PATENT DOCUMENTS

CN   1749824   3/2006
EP   0330811   9/1989
(Continued)

OTHER PUBLICATIONS

International Search Report issued in Patent Application No. PCT/JP2015/058277, dated Jun. 16, 2015.

*Primary Examiner* — James P Mackey
(74) *Attorney, Agent, or Firm* — Greenblum & Bernstein, P.L.C.

(57) ABSTRACT

The manufacturing apparatus of the present invention comprises a die for extruding a resin plate and a first roller and a second roller for molding the resin plate. The manufacturing apparatus further comprises: an inner deckel for dividing the resin plate and pre-forming a thick section; and a main molding section provided on the first roller and/or the second roller for molding a non-uniform thickness section from the thick section.

28 Claims, 8 Drawing Sheets

(51) Int. Cl.
  *B29D 11/00* (2006.01)
  *B29C 47/14* (2006.01)
  *B29K 33/00* (2006.01)
  *B29K 69/00* (2006.01)
  *B29L 7/00* (2006.01)
  *B29L 11/00* (2006.01)
  *B29C 47/16* (2006.01)

(52) U.S. Cl.
  CPC ........ *B29C 47/14* (2013.01); *B29D 11/00663* (2013.01); *B29C 47/16* (2013.01); *B29C 2043/466* (2013.01); *B29K 2033/08* (2013.01); *B29K 2069/00* (2013.01); *B29K 2995/0026* (2013.01); *B29L 2007/008* (2013.01); *B29L 2011/0075* (2013.01)

(56) References Cited

U.S. PATENT DOCUMENTS

| | | | | |
|---|---|---|---|---|
| 4,057,385 | A | * | 11/1977 | Yazaki ............ B29C 47/14 425/327 |
| 4,600,461 | A | | 7/1986 | Guy |
| 4,808,450 | A | | 2/1989 | Guy |
| 4,963,309 | A | | 10/1990 | Gohlisch et al. |
| 5,030,079 | A | * | 7/1991 | Benzing, II ......... B29B 17/0005 264/175 |
| 5,232,777 | A | * | 8/1993 | Sipinen ............. A61F 13/49009 428/162 |
| 5,478,516 | A | * | 12/1995 | Malm ................ B29C 47/0016 156/244.12 |
| 5,582,670 | A | * | 12/1996 | Andersen ................ C08L 1/28 156/242 |
| 6,576,077 | B1 | * | 6/2003 | Mitsuhashi ......... B29C 47/0019 156/117 |
| 6,910,875 | B2 | * | 6/2005 | Shimazaki .......... B29C 47/0038 425/327 |
| 7,186,110 | B2 | * | 3/2007 | Pan .................... B29C 47/0038 425/308 |
| 7,494,335 | B2 | * | 2/2009 | Hayashi .............. B29C 47/0019 425/327 |
| 9,108,349 | B2 | * | 8/2015 | Clarke ................... B29C 43/222 |
| 2006/0062868 | A1 | | 3/2006 | Pan et al. |
| 2008/0057148 | A1 | * | 3/2008 | Pitch .................. B29C 47/0021 425/380 |
| 2008/0274223 | A1 | | 11/2008 | Cloeren |
| 2009/0071598 | A1 | | 3/2009 | Takada et al. |
| 2013/0126543 | A1 | * | 5/2013 | Bohrer ................... B29C 43/24 220/810 |

FOREIGN PATENT DOCUMENTS

| | | |
|---|---|---|
| JP | 60-89341 | 5/1985 |
| JP | 61-146524 | 7/1986 |
| JP | 9-222514 | 8/1997 |
| JP | 2004-082359 | 3/2004 |
| JP | 2006-088649 | 4/2006 |
| JP | 2009-40009 | 2/2009 |
| JP | 2010-058437 | 3/2010 |
| JP | 2010-179489 | 8/2010 |
| WO | 2009/022715 | 2/2009 |
| WO | 2010/089944 | 8/2010 |

\* cited by examiner

MANUFACTURING APPARATUS FOR FILM OF NON-UNIFORM THICKNESS AND MANUFACTURING METHOD FOR FILM OF NON-UNIFORM THICKNESS

TECHNICAL FIELD

The present invention relates to an apparatus and a method for manufacturing a non-uniform-thickness film made of a synthetic resin, for example, a non-uniform-thickness film that is used as a light guide plate incorporated in a backlighting device of a liquid crystal display device.

BACKGROUND ART

A liquid crystal display device such as a tablet PC, a smartphone or the like employs a light guide plate (light guide film) of a edge-lit type as a back lighting device. An edge-lit-type light guide plate emits light incident on one edge (light incident surface) of the transparent square plate from its surface (light emitting surface). A back lighting device has a light source arranged on at least one edge of the light guide plate. The surface opposing the light emitting surface of the light guide plate (light-reflecting surface) is provided with an element for changing the advancing angle of the light transmitting inside the light guide plate (hereinafter, referred to as a "polarizing element"). Light incident on the light incident surface of the light guide plate is reflected by the light-reflecting surface, by which the advancing direction of the light is changed and the light propagates within the light guide plate and is emitted from the light emitting surface. In general, the light guide plate is provided with a polarizing element whose density distribution and shape are determined such that the brightness of the light is uniform over the entire light emitting surface.

A method for manufacturing such a light guide plate is generally an injection molding method like the method disclosed in Japanese Unexamined Patent Application Publication No. Heisei 9-222514. A light guide plate manufactured by an injection molding method is restricted in thinning the plate thickness due to limitations in fluidity, moldability and the like, and thus the thinner side of the plate thickness is 0.3-0.4 mm at the thinnest. In addition, since the size of the light guide plate is increased along with the increase in the size of the liquid crystal screens, a larger injection molding machine is necessary, which is associated with problems such as an increase in the manufacturing cost, requirements of excessive pressure, relatively long pressurizing time and cooling time to ensure the transfer accuracy, and the like.

As a method for solving such problems, a method for manufacturing a non-uniform-thickness film with an extruder has been proposed, in which at least two non-uniform-thickness films are extruded to be integrally molded such that they are symmetrically arranged side by side, like the method disclosed in Japanese Unexamined Patent Application Publication No. 2004-82359.

PRIOR ART DOCUMENTS

Patent Documents

Patent Document 1: Japanese Unexamined Patent Application Publication No. Heisei 9-222514
Patent Document 2: Japanese Unexamined Patent Application Publication No. 2004-82359

SUMMARY OF THE INVENTION

Problems to be Solved by the Invention

However, in order to obtain a light guide film by the manufacturing method disclosed in Japanese Unexamined Patent Application Publication No. 2004-82359, the thick portion of the symmetrically arranged non-uniform-thickness film needs to be cut apart. Moreover, in order to use the cut section as a light incident surface, the end face of the cut section needs to be carefully polished, rendering enhancement of manufacture efficiency difficult.

The present invention was made considering the above-described circumstances. The present invention has an objective of providing an apparatus for manufacturing a non-uniform-thickness film, which is capable of efficiently manufacturing the non-uniform-thickness film. In addition, the present invention has an objective of providing an apparatus and a method for manufacturing a non-uniform-thickness film, wherein a light guide film can easily be made only by dividing (cutting) the manufactured non-uniform-thickness film in a direction substantially vertical to the extruding direction.

Means for Solving the Problems

In order to solve the above-described problem, the present invention is constituted as follows.

(Aspect 1) An apparatus for manufacturing a non-uniform-thickness film comprising a die for extruding a resin plate, and a first roller and a second roller for molding the resin plate, wherein the apparatus comprises a preliminary molding section provided on the die side in order to mold an uneven portion to the resin plate, the uneven portion being uneven in thickness, and a main molding section provided on the first roller and/or the second roller in order to mold a non-uniform-thickness portion from the uneven portion.

(Aspect 2) The manufacturing apparatus according to Aspect 1, wherein the preliminary molding section divides and extrudes the resin plate in the die. (Aspect 3) The manufacturing apparatus according to Aspect 2, wherein the preliminary molding section is provided with one or more deckels on the die side. (Aspect 4) The manufacturing apparatus according to Aspect 1, wherein the preliminary molding section comprises the die and a second die for extruding a second resin plate whose width differs from that of the resin plate. (Aspect 5) The manufacturing apparatus according to Aspect 4, wherein the die and the second die are arranged side by side such that the resin plate extruded from the die and the second resin plate extruded from the second 50 die join to form a resin plate having the uneven portion.

(Aspect 6) The manufacturing apparatus according to either one of Aspects 4 and 5, wherein the preliminary molding section comprises an inner deckel in the second die in order to narrow a resin flow path in the second die. (Aspect 7) The manufacturing apparatus according to Aspect 1, wherein the preliminary molding section has one or more notched portions provided at a lip section of an extrusion port of the die. (Aspect 8) The manufacturing apparatus according to Aspect 7, wherein the notched portion is semicircular, semi-elliptic, dorm-shaped or polygonal. (Aspect 9) The manufacturing apparatus according to Aspect 8, wherein the polygonal shape is a triangle, a rectangle or a trapezoid.

(Aspect 10) The manufacturing apparatus according to any one of Aspects 1-9, wherein the main molding section comprises a truncated-cone-shaped portion provided on the first roller and a column-shaped portion provided on the second roller. (Aspect 11) The manufacturing apparatus according to any one of Aspects 1-9, wherein the main molding section comprises a truncated-cone-shaped portion and a disc-shaped portion provided on the first roller, and a column-shaped portion provided on the second roller, where the diameter of the disc-shaped portion is larger than the diameter of the larger-diameter face of the truncated-cone-shaped portion.

(Aspect 12) The manufacturing apparatus according to Aspect 11, wherein the manufacturing apparatus forms and provides a thick portion to a molded body of the non-uniform-thickness film between the truncated-cone-shaped portion of the first roller and the column-shaped portion of the second roller, and forms and provides a thin connecting portion to the molded body between the disc-shaped portion of the first roller and the column-shaped portion of the second roller. (Aspect 13) The manufacturing apparatus according to either one of Aspects 11 and 12, wherein the truncated-cone-shaped portion is a pair of truncated-cone-shaped portions, which are symmetrically arranged to sandwich the disc-shaped portion. (Aspect 14) The manufacturing apparatus according to any one of Aspects 10-13, wherein the respective portions configuring the first roller are integrally arranged on the same axis. (Aspect 15) The manufacturing apparatus according to any one of Aspects 10-14, wherein the disc-shaped portion is connected with the smaller-diameter face of the truncated-cone-shaped portion.

(Aspect 16) The manufacturing apparatus according to any one of Aspects 10-15, wherein the first roller further comprises a column-shaped portion. (Aspect 17) The manufacturing apparatus according to Aspect 16, wherein the column-shaped portion of the first roller is connected with the larger-diameter face of the truncated-cone-shaped portion of the first roller. (Aspect 18) The manufacturing apparatus according to any one of Aspects 1-9, wherein the main molding section comprises: a column-shaped portion and a disc-shaped portion provided on the first roller; and a truncated-cone-shaped portion and a small-diameter portion provided on the second roller, wherein the small-diameter portion is smoothly connected with the smaller-diameter face of the truncated-cone-shaped portion. (Aspect 19) The manufacturing apparatus according to Aspect 18, wherein the manufacturing apparatus forms a non-uniform-thickness portion to a molded body of the non-uniform-thickness film between the column-shaped portion of the first roller and the truncated-cone-shaped portion of the second roller, and forms a thin connecting portion to the molded body between the disc-shaped portion of the first roller and the small-diameter portion of the second roller.

(Aspect 20) The manufacturing apparatus according to either one of Aspects 18 and 19, wherein the truncated-cone-shaped portion is a pair of truncated-cone-shaped portions, which are symmetrically arranged to sandwich the small-diameter portion. (Aspect 21) The manufacturing apparatus according to any one of Aspects 18-20, wherein the respective portions configuring the first roller or the second roller are integrally arranged on the same axis. (Aspect 22) The manufacturing apparatus according to any one of Aspects 9-12, wherein the small-diameter portion is connected with the smaller-diameter face of the truncated-cone-shaped portion. (Aspect 23) The manufacturing apparatus according to any one of Aspects 18-22, wherein the second roller further comprises a column-shaped portion. (Aspect 24) The manufacturing apparatus according to Aspect 23, wherein the column-shaped portion of the second roller is connected with the larger-diameter face of the truncated-cone-shaped portion of the second roller.

(Aspect 25) The manufacturing apparatus according to either one of Aspects 12 and 19, wherein the non-uniform-thickness portion of the molded body is formed such that the thickness thereof changes from one side part to the other side part that are parallel to the extruding direction. (Aspect 26) The manufacturing apparatus according to any one of Aspects 10-25, wherein the surface of the truncated-cone-shaped portion is provided with a dot pattern. (Aspect 27) The manufacturing apparatus according to any one of Aspects 10-26, comprising a cutter section for cutting the molded body molded with the first roller and the second roller. (Aspect 28) The manufacturing apparatus according to any one of Aspects 12, 19 and 25, wherein the molded body of the non-uniform-thickness film comprises multiple molded sub-bodies, which are connected via the connecting portion.

(Aspect 29) A method for manufacturing a non-uniform-thickness film where the non-uniform-thickness film is molded using a die for extruding a resin plate and a first roller and a second roller for molding the resin plate, the method comprising: preliminarily molding an uneven portion being uneven in thickness to the resin plate by using a preliminary molding section provided on the die side; and mainly molding a non-uniform-thickness portion from the uneven portion by using a main molding section provided on the first roller and/or the second roller.

Effect of the Invention

According to the present invention, a resin plate that is preliminarily molded by a preliminary molding section can further be molded by a main molding section so that a non-uniform-thickness film that can easily be divided can be manufactured continuously.

MODES FOR CARRYING OUT THE INVENTION

Figure 1:
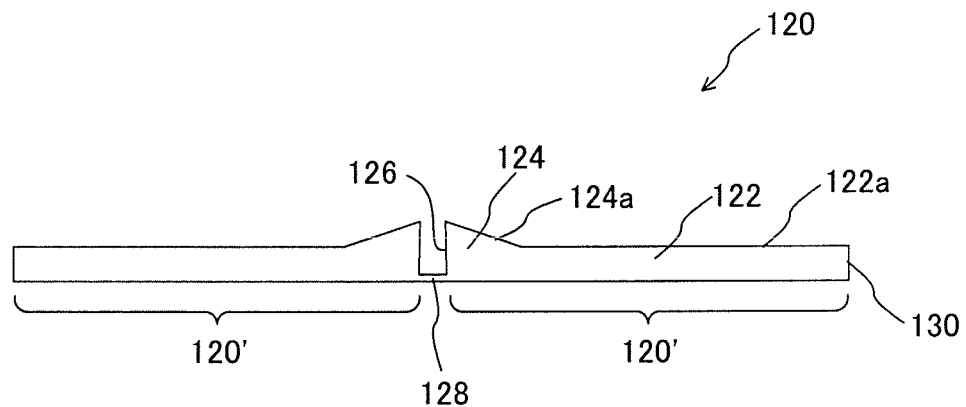
FIG. 1 A cross-sectional view of a non-uniform-thickness film manufactured in a first embodiment of the present invention.

Embodiments of an apparatus and a method for manufacturing a non-uniform-thickness film of the present invention will be described with reference to the drawings. In each figure, like parts are denoted by like reference numerals and the description thereof is omitted.

(First Embodiment)

A manufacturing apparatus and method according to a first embodiment of the present invention will be described with reference to FIGS. 1-5. In the first embodiment, a resin plate is extruded while dividing the resin with a deckel provided in a die so that thick portions are preliminarily molded at the ends of the divided resin plate and then a non-uniform-thickness portion is fully molded and provided to the resin plate with first and the second rollers.

FIG. 1 is a cross-sectional view of a molded body of a non-uniform-thickness film extruded by the manufacturing apparatus and method of the first embodiment, shown in a direction vertical to the extruding (longitudinal) direction. The molded body 120 consists of two molded sub-bodies 120'. The molded sub-body 120' is provided with a flat portion 122 that has a uniform film thickness, a non-uniform-thickness portion 124 whose film thickness changes, and a connecting portion 128 whose film thickness is thinner than the flat portion 122. The top surface of the molded body 120' is formed to rise on the non-uniform-thickness portion 124 side while the bottom surface of the molded body 120' is formed to be flat. The thickness (film thickness) of the non-uniform-thickness portion 124 decreases from the first side part 126 on the connecting portion 128 side towards the second side part 130 on the flat portion 122 side. The side parts 126 of the two non-uniform-thickness portions 124 oppose to each other via the connecting portion 128. The connecting portion 128 is formed on the bottom surface side of the molded bodies 120'.

Figure 2:
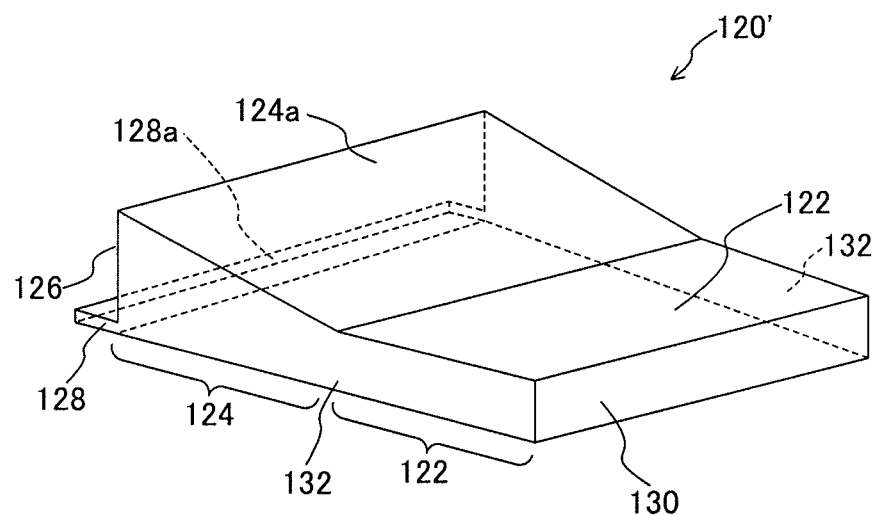
FIG. 2 A perspective view showing a molded sub-body of the non-uniform-thickness film shown in FIG. 1.

FIG. 2 is a perspective view showing a molded sub-body 120' obtained by cutting the molded body 120 of the non-uniform-thickness film shown in FIG. 1. The molded sub-body 120' is cut along the cut plane 128a of the connecting portion 128 parallel to the extruding direction, and also cut along two cut planes 132 that are vertical to the extruding direction.

According to the first embodiment, the two molded sub-bodies 120' are integrally molded to be symmetrically arranged side by side such that the side parts 126 thereof oppose to each other as shown in FIG. 1. Alternatively, multiple molded bodies including these two molded sub-bodies 120' may integrally be molded to be arranged side by side by connecting the side parts 130 via connecting portions. The entire connecting portion 128 is cut off from the molded sub-body 120' to use the resultant as a light guide film.

Referring to FIG. 2, the side part 126 serves as a light incident surface, the side part 130 serves as an end face, the sloped surface 124a of the non-uniform-thickness portion 124 serves as a light-reflecting surface, and the upper planar surface of the flat portion 122 serves as a light emitting surface. The sloped surface 124a as the light-reflecting surface is formed with a dot pattern that reflects light as will be described later.

Figure 3:
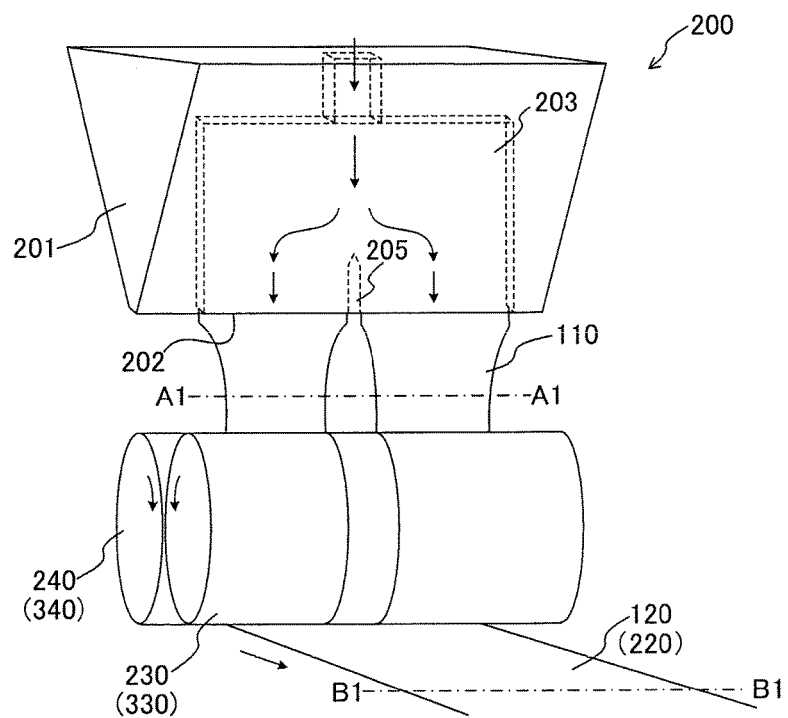
FIG. 3 A perspective view showing a manufacturing apparatus according to the first embodiment of the present invention.

FIG. 3 is a part perspective view of a manufacturing apparatus 200 for molding the molded body of the non-uniform-thickness film shown in FIG. 1. The manufacturing apparatus 200 is provided with a die 201 for accommodating and extruding a resin, a rectangular-shaped extrusion port 202 formed in the die 201, a first roller 230 and a second roller 240. The first and second rollers 230 and 240 are arranged beneath the extrusion port 202 to sandwich a pre-molded resin plate 110 extruded from the extrusion port 202.

The die 201 is provided with a manifold section 203 inside which a resin flows, and an inner deckel 205 arranged within the manifold section 203 and ahead of the extrusion port 202 (a preliminary molding section). A resin that flows inside the manifold section 203 is divided into two streams by the inner deckel 205 and extruded from the extrusion port 202. Alternatively, an outer deckel may be provided at the extrusion port, instead of the inner deckel 205. In FIG. 3, one inner deckel 205 is provided but the number thereof is not limited thereto and multiple inner deckels may be provided inside the manifold section 203.

Figure 4:
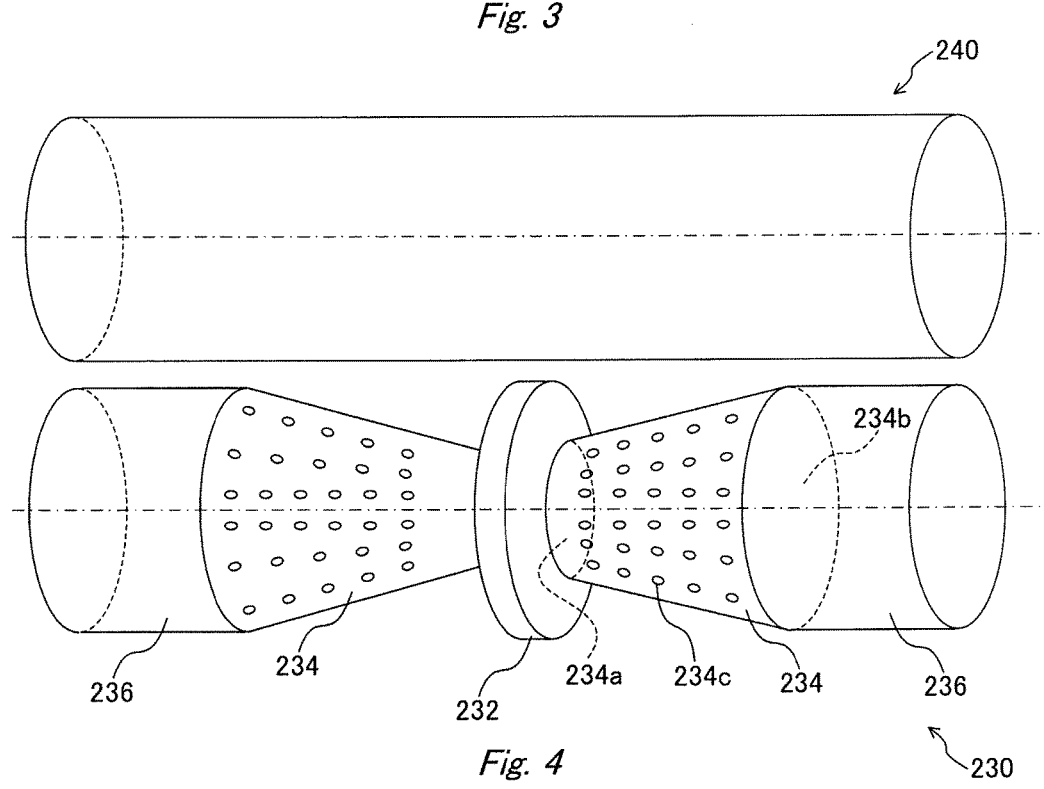
FIG. 4 A top perspective view showing first and second rollers of the manufacturing apparatus shown in FIG. 3.
Figure 5:
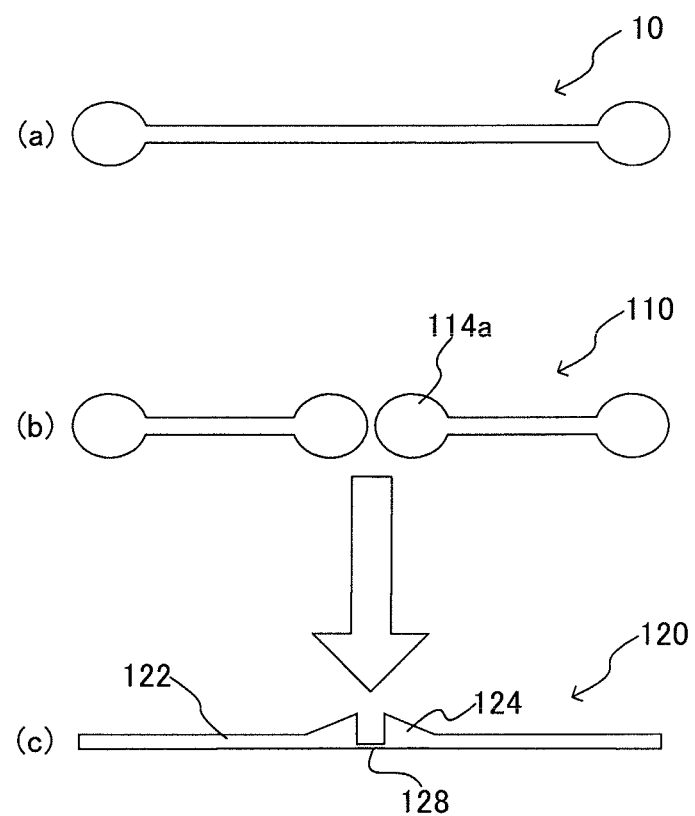
FIG. 5 A schematic view showing a molding process using the manufacturing apparatus of FIG. 3.

With reference to FIG. 4, the structure of the main molding section comprising the first roller 230 and the second roller 240 will be described. The first roller 230 comprises a disc-shaped portion 232, a pair of truncated-cone-shaped portions 234 that sandwich the disc-shaped portion 232, and a pair of column-shaped portions 236 arranged outside the respective pair of truncated-cone-shaped portions 234. The respective portions of the first roller 230 are integrally arranged such that their rotation centers are positioned along the same axis. The pair of truncated-cone-shaped portions 234 are symmetrically arranged with respect to the disc-shaped portion 232 with the smaller-diameter faces 234a facing inside and the larger-diameter faces 234b facing outside. The diameter of the disc-shaped portion 232 is larger than the diameter of the larger-diameter face 234a of the truncated-cone-shaped portion 234. The second roller 240 is a column-shaped portion as a whole, where the rotation center axis lines of the first and second rollers 230 and 240 are arranged to be parallel to each other. Alternatively, the first roller 230 and the second roller 240 in FIGS. 3 and 4 may be arranged reversely. As shown in FIG. 4, the entire surface of the truncated-cone-shaped portion 234 is provided with a dot pattern 234c, by which a light-reflecting surface is formed on the non-uniform-thickness portion 124. The second roller 240 has a smooth surface.

Steps for molding a molded body of a non-uniform-thickness film with the manufacturing apparatus 200 will be described. The manufacturing apparatus 200 heats a resin as a material of a light guide film to a temperature that allows the resin to have a low viscosity with a heating means (not shown). This resin is divided into two by the inner deckel 205 inside the manifold section 203 of the die 201, and extruded as two resin plates 110 from the extrusion port 202 of the die 201. FIG. 5(a) shows a cross-sectional shape of a resin plate 10 of a comparative example without the inner deckel 205. The resin plate 10 has ball-shaped thick portions at both ends FIG. 5(b) is a cross section of the resin plates 110 cut along line A1-A1 shown in FIG. 3. As shown in FIG. 5(b), the resin plates 110 extruded from the extrusion port 202 have been divided into two by the inner deckel 205, and each of them has thick portions (uneven portions) 114a at both ends. FIG. 5(c) is a cross section of the molded body 120 cut along line B1-B1 shown in FIG. 3.

The preliminary-molded resin plates 110 shown in FIG. 5(b) are guided to the two-stage rollers (main molding section) including the first and second rollers 230 and 240. The first and second rollers 230 and 240 shape the resin plates 110 to make a molded body 120. Specifically, as the resin plates 110 pass through the first and second rollers 230 and 240, the two thick portions 114a formed by the inner deckel 205 are guided to the disc-shaped portion 232 and the column-shaped portion 236 of the first roller 230. Then, the connecting portion 128 is formed from parts of the thick portions 114a of the resin plates 110 between the disc-shaped portion 232 of the first roller 230 and the second roller 240, the non-uniform-thickness portion 124 is formed from the thick portions 114a of the resin plates 110 between the truncated-cone-shaped portion 234 of the first roller 230 and the second roller 240, and the flat portion 122 is formed between the column-shaped portion 236 of the first roller 230 and the second roller 240. The dot pattern 234c of the truncated-cone-shaped portion 234 forms a dot pattern for light reflection on the resin plate.

Although it is not shown in FIG. 3, a third roller may be added to provide triple rollers. Usually, the third roller is controlled to have a temperature that is lower than the glass-transition temperature of the resin that forms the molded body 120. Accordingly, at least the surface of the molded body 120 is solidified when the molded body 120 leaves the triple rollers. The molded body 120 that left the triple rollers continues to advance while being further cooled in the air, is divided in the longitudinal direction at a cutter section (not shown) with a slitter, an edge knife or the like, and is further divided and cut in the plate width direction with a push-cutter or the like, thereby forming a light guide film. Thus dots can be formed simultaneously with the molding of the plastic panel (molded body 120). Depending on the thickness or the width of the connecting portion 128 of the thin film shown in FIG. 1, dividing in the longitudinal direction may be omitted, in which case the molded body may be split to make light guide films at the stage of assembling the light guide film into a product. Furthermore, in the first embodiment, the disc-shaped portion 232 shown in FIG. 4 may be omitted. In this case, the thick center part of the molded body 120 of the non-uniform-thickness film can be cut to make light guide films.

(Second Embodiment)

A manufacturing apparatus and method of a second embodiment of the present invention will be described with reference to FIGS. 6-8. In the second embodiment, first and second rollers 330 and 340 shown in FIG. 8 are used instead of the first and second rollers 230 and 240 of the first embodiment.

Figure 6:
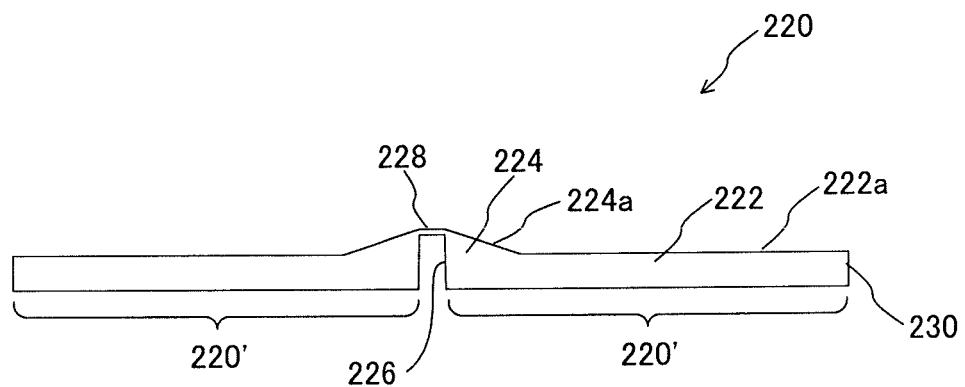
FIG. 6 A cross-sectional view of a non-uniform-thickness film manufactured in a second embodiment of the present invention.

FIG. 6 is a cross-sectional view of a molded body of a non-uniform-thickness film extruded by the manufacturing apparatus and method of the second embodiment, shown in a direction vertical to the extruding direction. The molded body 220 consists of two molded sub-bodies 220'. The molded sub-body 220' is provided with a flat portion 222 that has a uniform film thickness, a non-uniform-thickness portion 224 whose film thickness changes, and a connecting portion 228 whose film thickness is thinner than the flat portion 222. The top surface of the molded body 220' is formed to rise on the non-uniform-thickness portion 224 side while the bottom surface of the molded body 220' is formed to be flat. The thickness (film thickness) of the non-uniform-thickness portion 224 decreases from the first side part 226 on the connecting portion 228 side towards the second side part 230 on the flat portion 232 side. The side parts 226 of the two non-uniform-thickness portions 224 oppose to each other via the connecting portion 228. The connecting portion 228 is formed on the top surface side of the rising molded body 120'.

Figure 7:
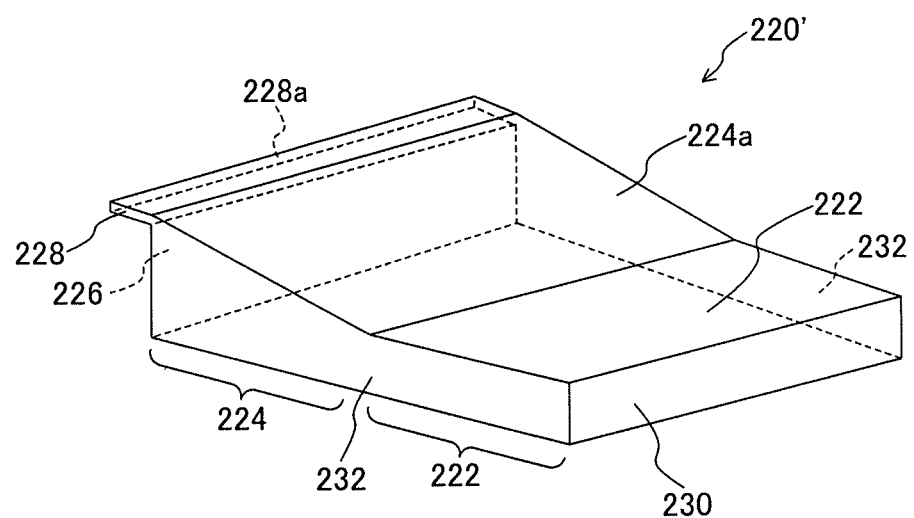
FIG. 7 A perspective view showing a molded sub-body of the non-uniform-thickness film shown in FIG. 6.
Figure 8:
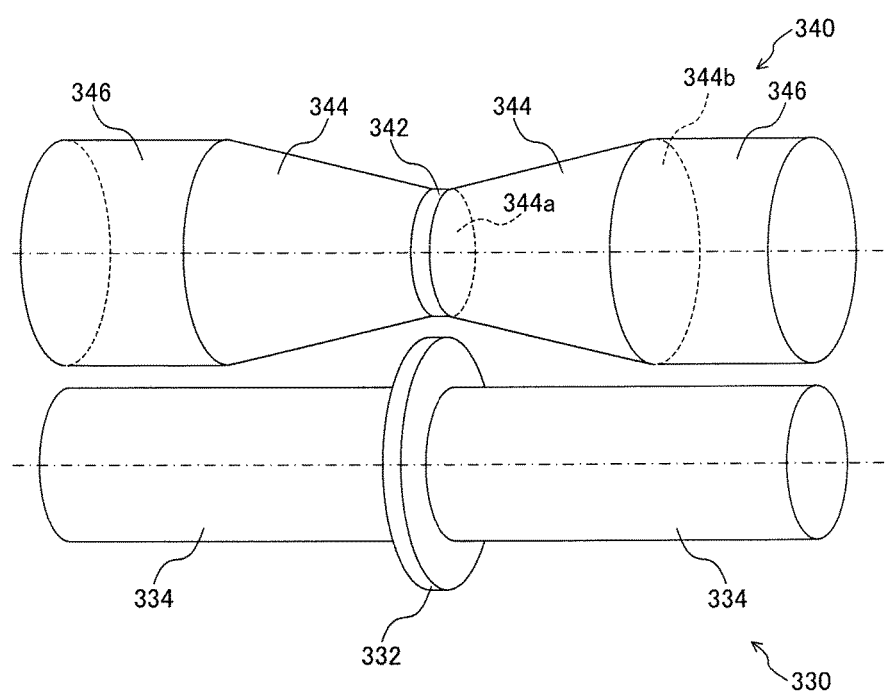
FIG. 8 A top perspective view showing first and second rollers of the manufacturing apparatus according to the second embodiment of the present invention.

FIG. 7 is a perspective view showing the molded sub-body 220' obtained by cutting the molded body 220 of the non-uniform-thickness film shown in FIG. 6. The molded sub-bodies 220' are cut along a cut plane 228a of the connecting portion 228 that is parallel to the extruding direction, and also cut along two cut planes 232 that are vertical to the extruding direction.

According to the second embodiment, the two molded sub-bodies 220' are integrally molded to be symmetrically arranged side by side such that both side parts 226 thereof oppose to each other as shown in FIG. 6. Alternatively, multiple molded bodies including these two molded sub-bodies 220' may integrally be molded to be arranged side by side by connecting the side parts 230 via connecting portions. The entire connecting portion 228 is cut off from the molded sub-body 220' to use the resultant as a light guide film.

Referring to FIG. 7, the side part 226 serves as a light incident surface, the side part 230 serves as an end face, the sloped surface 224a of the non-uniform-thickness portion 224 serves as a light-reflecting surface, and the upper planar surface of the flat portion 232 serves as a light emitting surface 232a. The sloped surface 224a as the light-reflecting surface is formed with a dot pattern.

In the second embodiment, a manufacturing apparatus for molding a molded body of a non-uniform-thickness film is similar to the manufacturing apparatus 200 of the first embodiment (FIG. 3). Only the first roller and the second roller of the manufacturing apparatus of the second embodiment have structures different from those of the manufacturing apparatus 200. Hereinafter, the first roller 330 and the second roller 340 used in the manufacturing apparatus of the second embodiment will be described.

As shown in FIG. 8, the first roller 330 consists of a disc-shaped portion 332, and a pair of column-shaped portions 334 that sandwich the disc-shaped portion 332. The respective portions of the first roller 330 are integrally arranged such that their rotation centers are positioned along the same axis. The diameter of the disc-shaped portion 332 is larger than the diameter of the column-shaped portion 334. The second roller 340 consists of a small-diameter portion 342, a pair of truncated-cone-shaped portions 344 sandwiching the small-diameter portion 342, and a pair of column-shaped portions 346 arranged outside the pair of truncated-cone-shaped portions 344, respectively. The pair of truncated-cone-shaped portions 334 are symmetrically arranged to sandwich the small-diameter portion 342 with the smaller-diameter faces 334a facing inside and the larger-diameter faces 334b facing outside. The diameter of the smaller-diameter face 344a of the truncated-cone-shaped portion 344 is the same as the diameter of the small-diameter portion 342. The small-diameter portion 342 is smoothly connected with the truncated-cone-shaped portion 344 on the smaller-diameter face 344a side. The diameter of the larger-diameter face 344b of the truncated-cone-shaped portion 344 is the same as the diameter of the column-shaped portion 346. Alternatively, the first roller 330 and the second roller 340 may be arranged reversely. Although it is not shown, the entire surface of the truncated-cone-shaped portion 334 is provided with a dot pattern. The first roller 330 has a smooth surface.

Steps for molding a molded body of a non-uniform-thickness film according to the second embodiment will be described. Steps that are the same as the molding steps of the first embodiment will be omitted. The preliminary-molded resin plates 110 extruded from the extrusion port 202 of the die 201 are guided to the two-stage rollers (main molding section) including the first and second rollers 330 and 340. As the resin plates 110 pass through the first and second rollers 330 and 340, a connecting portion 228 is formed from the thick portions 114a of the resin plate 110 between the disc-shaped portion 332 of the first roller 340 and the small-diameter portion 342 of the second roller 340, a non-uniform-thickness portion 224 is formed from the thick portions 114a of the resin plate 110 between the inner part of the column-shaped portion 334 of the first roller 330 and the truncated-cone-shaped portion 344 of the second roller 340, and a flat portion 222 is formed between the outer part of the column-shaped portion 334 of the first roller 330 and the column-shaped portion 346 of the second roller 340. The dot pattern of the truncated-cone-shaped portion 344 forms a dot pattern for light reflection on the resin plate. In the second embodiment, the disc-shaped portion 332 shown in FIG. 7 may be omitted. In this case, the thick center part of the molded body 120 of the non-uniform-thickness film can be cut to make light guide films.

(Third Embodiment)

An apparatus and a method for manufacturing a non-uniform-thickness film according to a third embodiment of the present invention will be described with reference to FIGS. 9 and 10. In a manufacturing apparatus 200B of the third embodiment, a tandem machine comprising a first die 201A and a second die 201B is used to mold and provide a thick portion to a resin plate. The first die 201A and the second die 201B composing a preliminary molding section is arranged above and parallel to the first roller 230 (330) and the second roller 240 (340).

The first die 201A has the same structure as the die 201 shown in FIG. 3 except that the first die 201A differs from the die 201 in that it is not provided with a center deckel 205. Accordingly, a wide resin plate 110A is extruded from the extrusion port 202A of the die 201A. The second die 201B also has a similar structure to the die 201 shown in FIG. 3 except that the second die 201B is not provided with a center deckel 205 but provided with a pair of inner deckels 205B inside a manifold section 203B. The pair of inner deckels 205B are brought inwardly and arranged such that the resin flow path within the manifold section 203B is narrowed. This arrangement allows a width of a resin plate 110B extruded from the extrusion port 202B to be narrower than a width of a resin plate 110A.

Steps for molding a molded body of a non-uniform-thickness film with the manufacturing apparatus 200B will be described. The manufacturing apparatus 200B heats a resin as a material of a light guide film to a temperature that allows the resin to have a low viscosity with a heating means (not shown). This resin is extruded as a wide resin plate 110A from the extrusion port 202A of the first die 201A and also as a narrow resin plate 110B from the extrusion port 202B of the second die 201B. These resin plates 110A and 110B travel downward while approaching each other and are integrated to form a joined resin plate 115, which is guided and molded between the first roller 230 and the second roller 240.

Figure 9:
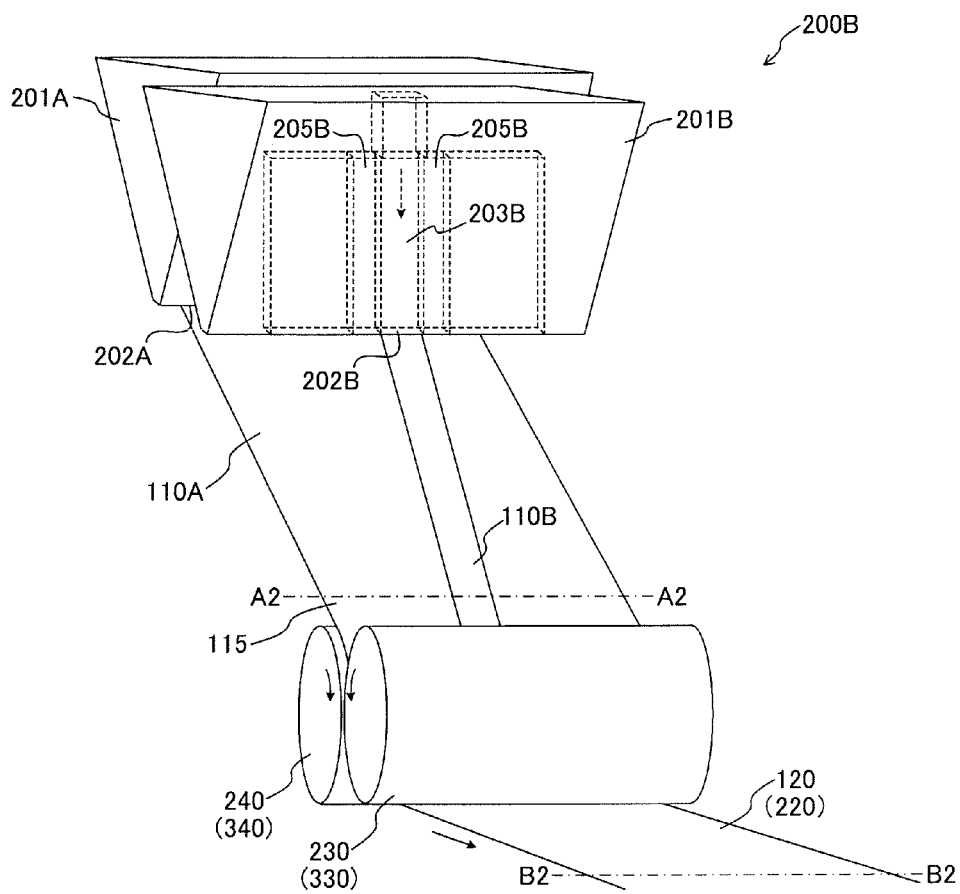
FIG. 9 A perspective view showing a manufacturing apparatus according to a third embodiment of the present invention.
Figure 10:
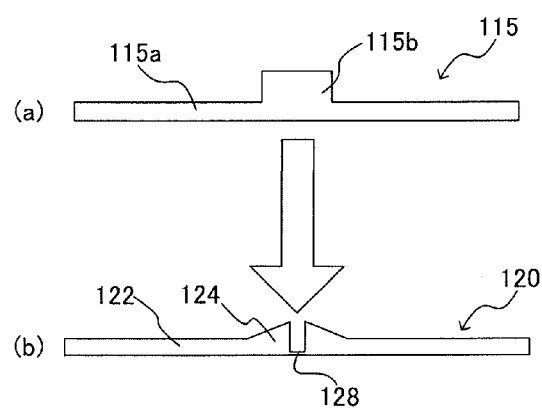
FIG. 10 A schematic view showing a molding process using the manufacturing apparatus of FIG. 9.

FIG. 10(*a*) is a cross section of the joined resin plate 115 cut along line A2-A2 shown in FIG. 9. FIG. 10(*b*) is a cross section of the molded body 120 cut along line B2-B2 shown in FIG. 9. As can be appreciated from FIG. 10(*a*), the joined resin plate 115 comprises a flat portion 115a that has a thickness corresponding to that of the resin plate 110A and a thick portion (uneven portion) 115b that has a thickness corresponding to those of the resin plate 110A and the resin plate 110B.

A main molding section comprising the first and second rollers 230 (330) and 240 (340) shown in FIG. 4 shapes the joined resin plate 115 to make a molded body 120 (220). Specifically, as the thick portion 115b of the joined resin plate 115 passes through the first and second rollers 230 and 240, it is guided between the disc-shaped portion 232 of the first roller 230 and the column-shaped second roller 240. Then, the connecting portion 128 is formed from a part of the thick portion 115b of the joined resin plate 115 between the disc-shaped portion 232 of the first roller 230 and the second roller 240, the non-uniform-thickness portion 124 is formed from the thick portion 115b of the joined resin plate 115 between the truncated-cone-shaped portion 234 of the first roller 230 and the second roller 240, and the flat portion 122 is formed from the flat portion 115a of the joined resin plate 115 between the column-shaped portion 236 of the first roller 230 and the second roller 240.

(Fourth Embodiment)

Figure 11:
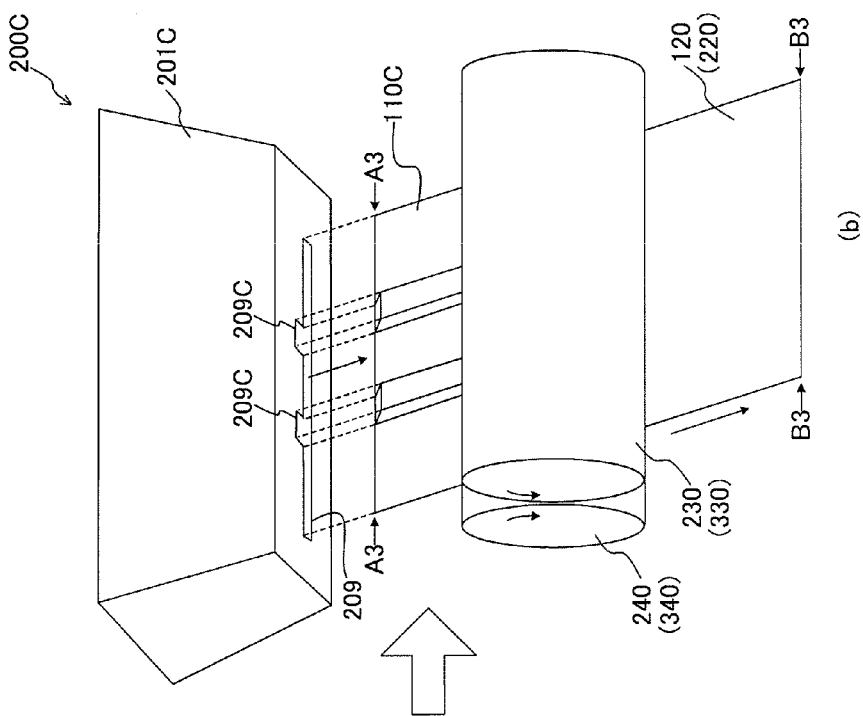
FIG. 11 (a) A perspective view showing a manufacturing apparatus according to a comparative example and (b) a perspective view showing a manufacturing apparatus according to a fourth embodiment of the present invention.
Figure 11:
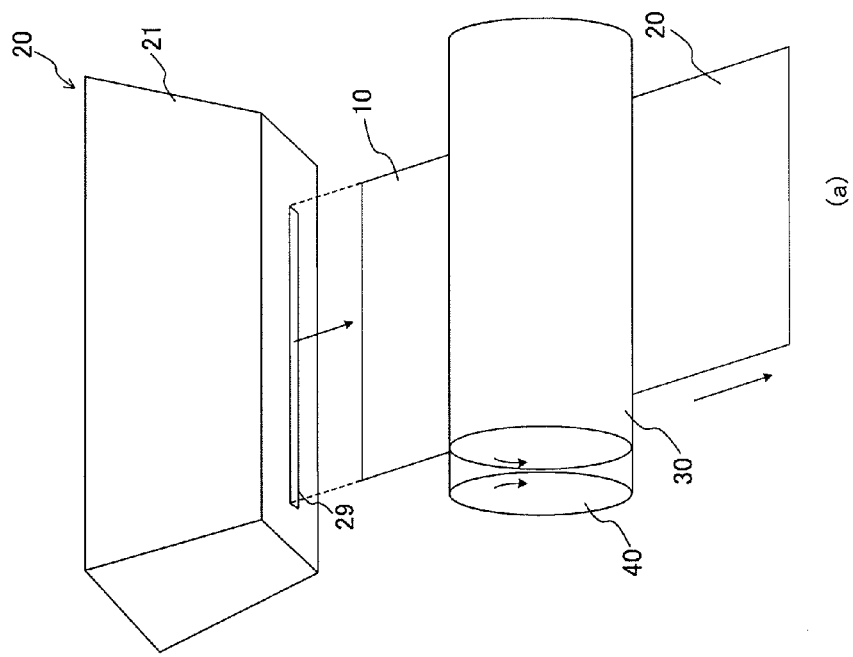

An apparatus and a method for manufacturing a non-uniform-thickness film of a fourth embodiment of the present invention will be described with reference to FIGS. 11 and 12. A manufacturing apparatus 200C of the fourth embodiment forms a thick portion by making a lip section of the die to have an uneven shape. FIG. 11(*a*) shows a manufacturing apparatus 20 of a comparative example, which is a conventional film manufacturing apparatus that is not used for manufacturing a non-uniform-thickness film. A die 21 of the manufacturing apparatus 20 is provided with a lip section 29 with a rectangular-shaped opening as an extrusion port, and extrudes a resin plate 10 with a flat rectangular-shaped cross section.

On the other hand, a lip section 209 of a die 201C of the manufacturing apparatus 200C of the fourth embodiment is provided with notched portions 209C (a preliminary molding section) as shown in FIG. 11(*b*). Although the notched portions 209C are shown to have rectangular shapes, they are not limited thereto, and the notched portions 209C may be formed to have polygonal (triangular, rectangular or trapezoidal), semicircular or semi-elliptic shapes or the like. Moreover, the number, the size and the arrangement of the notched portions 209C may suitably be altered according to the position and/or the shape of the thick portion of the molded body 120.

Steps for molding a molded body of a non-uniform-thickness film with the manufacturing apparatus 200C will be described. The manufacturing apparatus 200C heats a resin as a material of a light guide film to a temperature that allows the resin to have a low viscosity with a heating means (not shown). This resin is extruded as an uneven resin plate 110C from the lip section 209 provided at the extrusion port of the die 201C. The uneven resin plate 110C is guided to and fully molded between the first roller 230 (330) and the second roller 240 (340) to form a molded body 120.

Figure 12:
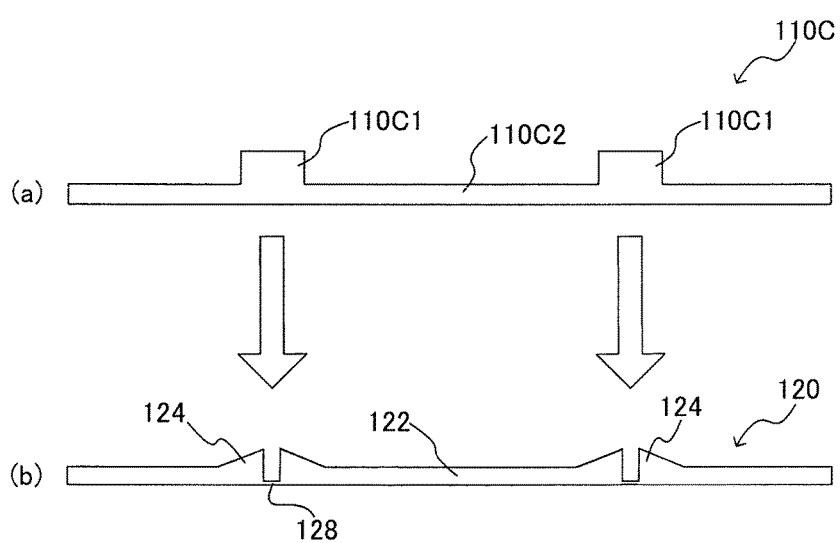
FIG. 12 A schematic view showing a molding process using the manufacturing apparatus of FIG. 11(b).

FIG. 12(*a*) is a cross section of the uneven resin plate 110C cut along line A3-A3 shown in FIG. 11. FIG. 12(*b*) is a cross section of the molded body 120 cut along line B3-B3 shown in FIG. 11. As can be appreciated from FIG. 12(*a*), the uneven resin plate 110C comprises thick portions (uneven portions) 110C1 corresponding to the notched portions 209C and a flat portion 110C2.

A main molding section comprising the first and second rollers 230 and 240 shown in FIG. 4 shapes the uneven resin plate 110C to make a molded body 120. Specifically, as the thick portions 110C1 of the uneven resin plate 110C pass through the first and second rollers 230 and 240, they are guided to the disc-shaped portion 232 and the column-shaped portion 236 of the first roller 230. Then, the connecting portion 128 is formed from parts of the thick portions 110C1 of the uneven resin plate 110C between the disc-shaped portion 232 of the first roller 230 and the second roller 240, the non-uniform-thickness portions 124 are formed from the thick portions 115b of the uneven resin plate 110C between the truncated-cone-shaped portions 234 of the first roller 230 and the second roller 240, and the flat portion 122 is formed from the flat portion 110C2 of the uneven resin plate 110C between the column-shaped portion 236 of the first roller 230 and the second roller 240.

Although each embodiment was described using two-stage rollers, the number of rollers is not limited to two, and may be three, i.e., the first, second and third rollers, or four or more. In each embodiment, a transparent resin such as an acrylic resin, a polycarbonate resin or the like is used as a non-uniform-thickness film that is used for manufacturing a light guide film. In each embodiment, a polarizing element may be embossed onto the bottom surface of the molded body 120 or 220 using an indented embossing surface. In each embodiment, the first and second rollers 230 and 240 are interchangeable with the first and second rollers 330 and 340.

As can be appreciated from the above description, the present invention is capable of continuously and inexpensively manufacturing a non-uniform-thickness film as a molded body having a shape with an uneven-cross-section as typified by a wedge-shaped light guide film.

DESCRIPTION OF REFERENCE NUMERALS

110 Resin plate
110A Resin plate
110B Resin plate
110C Resin plate
115 Joined resin plate
120 Molded body
124 Non-uniform-thickness portion
122 Flat portion
128 Connecting portion
200 Manufacturing apparatus
200B Manufacturing apparatus
200C Manufacturing apparatus
201 Die
202 Extrusion port
203 Manifold section
205 Center deckel
205B Inner deckel
209 Lip section
209C Notched portion
230 First roller
240 Second roller
232 Disc-shaped portion
234 Truncated-cone-shaped portion
236 Column-shaped portion
220 Molded body
224 Non-uniform-thickness portion
222 Flat portion
228 Connecting portion
330 First roller
340 Second roller
332 Disc-shaped portion
334 Column-shaped portion
342 Small-diameter portion
344 Truncated-cone-shaped portion
346 Column-shaped portion

What is claimed is:

1. An apparatus for manufacturing a non-uniform-thickness film comprising a die for extruding a resin plate, and a first roller and a second roller for molding the resin plate, wherein the apparatus comprises:
a preliminary molding section provided at the die and configured to mold an uneven portion to the resin plate, the uneven portion being uneven in thickness; and
a main molding section provided on at least one of the first roller and the second roller in order to mold a non-uniform-thickness portion from the uneven portion, wherein
the main molding section comprises:
a pair of truncated-cone-shaped portions and a disc-shaped portion sandwiched between the pair of truncated-cone-shaped portions on the first roller, the pair of truncated-cone-shaped portions being symmetrically arranged with respect to the disc-shaped portion such that smaller-diameter faces of the truncated-cone-shaped portions face the disc-shaped portion and larger-diameter faces of the truncated-cone-shaped portions face outer ends of the first roller; and
a column-shaped portion provided on the second roller, where a diameter of the disc-shaped portion is larger than a diameter of a larger-diameter face of the truncated-cone-shaped portion.

2. The manufacturing apparatus according to claim 1, wherein
the preliminary molding section divides and extrudes the resin plate at the die.

3. The manufacturing apparatus according to claim 2, wherein
the preliminary molding section is provided with one or more deckels in the die.

4. The manufacturing apparatus according to claim 1, wherein
the preliminary molding section comprises the die and a second die for extruding a second resin plate having a width that differs from a width of the resin plate.

5. The manufacturing apparatus according to claim 4, wherein
the die and the second die are arranged side by side such that the resin plate extruded from the die and the second resin plate extruded from the second die join to form a joined resin plate having the uneven portion.

6. The manufacturing apparatus according to claim 4, wherein
the preliminary molding section comprises an inner deckel in the second die in order to narrow a resin flow path in the second die.

7. The manufacturing apparatus according to claim 1, wherein
the preliminary molding section has one or more notched portions provided at a lip section of an extrusion port of the die.

8. The manufacturing apparatus according to claim 7, wherein
the notched portion is one of semicircular, semi-elliptic, dorm-shaped or polygonal.

9. The manufacturing apparatus according to claim 8, wherein
the polygonal shape is one of a triangle, a rectangle or a trapezoid.

10. The manufacturing apparatus according to claim 1, wherein
the manufacturing apparatus is configured to form the uneven portion to the extruded resin plate,
the manufacturing apparatus is configured to provide the resin plate having the uneven portion between the pair of the truncated-cone-shaped portions of the first roller and the column-shaped portion of the second roller to shape a molded body, and
the manufacturing apparatus is configured to form and provide a connecting portion to the molded body when the uneven portion is passed between the disc-shaped portion of the first roller and the column-shaped portion of the second roller.

11. The manufacturing apparatus according to claim 1, wherein
the pair of truncated-cone-shaped portions and the disc-shaped portion configuring the first roller are integrally arranged on the same axis.

12. The manufacturing apparatus according to claim 1, wherein
the disc-shaped portion is connected with the smaller-diameter faces of the pair of truncated-cone-shaped portions.

13. The manufacturing apparatus according to claim 1, wherein
the first roller further comprises a column-shaped portion.

14. The manufacturing apparatus according to claim 13, wherein
the column-shaped portion of the first roller is connected with each of the larger-diameter faces of the truncated-cone-shaped portions of the first roller.

15. The manufacturing apparatus according to claim 10, wherein
the non-uniform-thickness portion of the molded body is formed such that the thickness thereof changes from one side part to the other side part that are parallel to an extruding direction of the resin plate.

16. The manufacturing apparatus according to claim 1, wherein
a surface of at least one of the pair of truncated-cone-shaped portions is provided with a dot pattern.

17. The manufacturing apparatus according to claim 1, further comprising:
a cutter section for cutting a molded body formed from the extruded resin plate passing through the first roller and the second roller.

18. The manufacturing apparatus according to claim 10, wherein
the molded body of the non-uniform-thickness film comprises multiple molded sub-bodies, which are connected via the connecting portion.

19. The manufacturing apparatus according to claim 1, wherein a diameter of the disc-shaped portion is larger than a diameter of the larger-diameter faces of the pair of truncated-cone-shaped portions.

20. An apparatus for manufacturing a non-uniform-thickness film comprising a die for extruding a resin plate, and a first roller and a second roller for molding the resin plate, wherein the apparatus comprises:
a preliminary molding section provided at the die and configured to mold an uneven portion to the resin plate, the uneven portion being uneven in thickness; and
a main molding section provided on at least one of the first roller and the second roller in order to mold a non-uniform-thickness portion from the uneven portion, wherein
the main molding section comprises:
a column-shaped portion and a first disc-shaped portion provided on the first roller; and
a truncated-cone-shaped portion and a second disc-shaped portion provided on the second roller, wherein
the second disc-shaped portion is connected with a smaller-diameter face of the truncated-cone-shaped portion.

21. The manufacturing apparatus according to claim 20, wherein
the manufacturing apparatus is configured to form and provide a non-uniform-thickness portion to a molded body of the non-uniform-thickness film when the extruded resin plate is passed between the column-shaped portion of the first roller and the truncated-cone-shaped portion of the second roller, and
the manufacturing apparatus is configured to form and provide a connecting portion to the molded body when the extruded resin plate is passed between the first disc-shaped portion of the first roller and the second disc-shaped portion of the second roller.

22. The manufacturing apparatus according to claim 20, wherein
the truncated-cone-shaped portion is a pair of truncated-cone-shaped portions, which are symmetrically arranged to sandwich the second disc-shaped portion.

23. The manufacturing apparatus according to claim 20, wherein
the respective portions configuring the first roller and the second roller are integrally arranged on the same axis.

24. The manufacturing apparatus according to claim 20, wherein
the second roller further comprises a column-shaped portion.

25. The manufacturing apparatus according to claim 24, wherein
the column-shaped portion of the second roller is connected with a larger-diameter face of the truncated-cone-shaped portion of the second roller.

26. The manufacturing apparatus according to claim 20, wherein an outer surface of the first disc-shaped portion of the first roller is nearer to an outer surface of the second disc-shaped portion of the second roller than a periphery of a larger-diameter face of the truncated-cone-shaped portion in a radial direction of the second roller.

27. A method for manufacturing a non-uniform-thickness film where the non-uniform-thickness film is molded using a die for extruding a resin plate and a first roller and a second roller for molding the resin plate, the method comprising:
preliminarily molding an uneven portion being uneven in thickness to the resin plate by using a preliminary molding section provided at the die; and
mainly molding a non-uniform-thickness portion from the uneven portion by using a main molding section provided on at least one of the first roller and the second roller, wherein
the main molding section comprises:
a pair of truncated-cone-shaped portions and a disc-shaped portion sandwiched between the pair of truncated-cone-shaped portions on the first roller, the pair of truncated-cone-shaped portions being symmetrically arranged with respect to the disc-shaped portion such that smaller-diameter faces of the truncated-cone-shaped portions face the disc-shaped portion and larger-diameter faces of the truncated-cone-shaped portions face outer ends of the first roller; and a column-shaped portion provided on the second roller, where a diameter of the disc-shaped portion is larger than a diameter of a larger-diameter face of the truncated-cone-shaped portion.

28. A method for manufacturing a non-uniform-thickness film where the non-uniform-thickness film is molded using a die for extruding a resin plate and a first roller and a second roller for molding the resin plate, the method comprising:

preliminarily molding an uneven portion being uneven in thickness to the resin plate by using a preliminary molding section provided at the die; and mainly molding a non-uniform-thickness portion from the uneven portion by using a main molding section provided on at least one of the first roller and the second roller, wherein the main molding section comprises:

a column-shaped portion and a first disc-shaped portion provided on the first roller; and a truncated-cone-shaped portion and a second disc-shaped portion provided on the second roller, wherein the second disc-shaped portion is connected with a smaller-diameter face of the truncated-cone-shaped portion.

* * * * *